US005154331A

United States Patent [19]

Sanders

[11] Patent Number: 5,154,331

[45] Date of Patent: Oct. 13, 1992

[54] WHEELCHAIR ARM REST AND POUCH

[76] Inventor: Daniel W. Sanders, 8685 Hastings St. NE., Blaine, Minn. 55434

[21] Appl. No.: 535,886

[22] Filed: Jun. 11, 1990

[51] Int. Cl.[5] .......... B60R 7/00; B60R 9/00

[52] U.S. Cl. .......... 224/42.46 R; 224/275; 224/42.11

[58] Field of Search .......... 224/275, 42.11, 42.46 R, 224/42.46 B, 30 A, 32 R, 36; 280/304.1; 297/194, DIG. 4

[56] References Cited

U.S. PATENT DOCUMENTS 2,061,302 11/1936 Egler .......... 297/194
4,339,061 7/1982 Dunn .......... 224/42.46 R
4,577,903 3/1986 Wells .......... 224/42.46 R
4,637,534 1/1987 Leppek .......... 224/36
4,720,027 1/1988 Board .......... 224/32 R
4,730,869 3/1988 Schumacher .......... 280/304.1
5,031,807 7/1991 Tiffany .......... 224/32 R

*Primary Examiner*—Henry J. Recla
*Assistant Examiner*—David J. Walczak
*Attorney, Agent, or Firm*—Moore & Hansen

[57] ABSTRACT

A device for providing a secure storage area for the personal items of a wheelchair user. The device includes padded arm rests to encourage the user to rest their arms on the comfortable, padded surface, further enhancing the security of the storage device by making it more difficult to remove the storage device from the arm resting portions of the wheelchair witthout detection by the wheelchair user.

31 Claims, 2 Drawing Sheets

WHEELCHAIR ARM REST AND POUCH

BACKGROUND OF THE INVENTION

1. Technical Field

This invention relates to devices that provide a convenient means for storing and carrying relatively small items that may be frequently needed while moving about in a wheelchair, while simultaneously enhancing the comfort of a standard wheelchair arm rest. Specifically, the device enables a user to easily, conveniently and safely transport such frequently needed items as keys, medicine and makeup, as well as larger items such as sweaters and umbrellas, without the need for carrying the items in a bulky purse or awkward bags.

2. Background Information

For those temporarily or permanently restricted to a wheelchair, the difficulties involved in securely transporting and keeping track of small, frequently needed items such as keys, medicine, reading glasses and makeup can be great. People restricted to wheelchairs frequently reside in group residences such as hospitals or nursing homes. Although security may be of the highest caliber, the resident may nevertheless live in constant fear that their items are at risk of being stolen should they be distracted by nearby activities or temporarily doze off. Indeed, small personal items may be easily taken from such a person should they be sitting on their lap or resting on a tray or in a basket fastened to the wheelchair arms. Similarly, a person restricted to a wheelchair on a shopping trip away from their home is frequently considered an easy target by potential thieves because that person frequently lacks the ability to defend their belongings and usually lacks the ability to pursue the person who has taken their goods. If the use of an arm or hand is also restricted, this difficulty may be greatly compounded. Under these circumstances, if one wishes to travel even the slightest distance from one's home or hospital room, one must depend on the assistance of another, carry a bulky pouch or purse in one's lap, or wear a shirt or vest with blousy, cumbersome pockets.

If one carries a pouch or purse in their lap, any number of circumstances may arise that could cause the pouch or purse to be sent tumbling to the floor, resulting in great distress to the person who has dropped it. Likewise, if the user has only one hand or arm available to hold the pouch and simultaneously unzip or unsnap it, it may be only with great difficulty or the assistance of a passerby that access to the contents of the pouch is ultimately gained.

Prior attempts at providing a storage compartment attached to the wheelchair are represented by the device disclosed in U.S. Pat. No. 4,919,443 issued to Kehler Apr. 24, 1990. The Kehler device is a storage box mounted on one of the upright posts to which the back support is attached, and must be pivoted about the upright post to the side of the wheelchair from its normal storage position behind the back support to gain access to the contents stored therein. Wheelchair users, however, frequently lack the mobility needed to reach an object fastened behind them to the rear of the wheelchair.

Another problem frequently faced by wheelchair users is that when moving about in the wheelchair on wet surfaces, the large rear wheels tend to splash both the user and the person who may be pushing the wheelchair. Prior art devices of the type discussed lack any provision for splash guards that help protect the wheelchair user and the person pushing the wheelchair and keep them dry.

Similarly, large pockets on shirts or vests are frequently used to carry relatively small items, but they have no closure device by which to keep the contents of the pocket from spilling out. Further, if the pocket is close to the body as with a shirt pocket, it may be that its contents are too close to the face of the wearer to be suitably inspected, and the item being sought may not be easily identified. As for larger items such as sweaters, umbrellas or small packages, there is no secure, easily accessible way of transporting these items short of resting them on the lap of the wheelchair user. This method has the obvious drawback of lacking security, and allowing these larger items easily to fall to the ground.

SUMMARY OF THE INVENTION

The present invention is intended to provide a convenient storage pouch for users of wheelchairs. The pouch hangs from one or both of the wheelchair arm rests, and includes a padded section positioned above the arm rest, providing added comfort for the wheelchair user. More importantly, the arm rest padding encourages the user to rest his arm on the arm rest, increasing the security of the items stored in the pouches by rendering the pouches more difficult to remove from the wheelchair. Using VELCRO® fasteners, snaps or other easily operated fastening means, the pouch may be conveniently attached to or detached from the arm rest portion of the wheelchair. Other easily operated fasteners, such as strips of VELCRO®, may be provided to secure the openings to the pouch sections.

The device may include pouch sections located on both sides of the wheelchair arm rest, and may be made of a soft fabric material. The pouch section located on the outside of the arm rest may be shaped to the contour of the wheel on that side of the wheelchair. One or more storage compartments may then be located within the pouch section, each storage compartment having its own VELCRO® or other closure device. These storage compartments should be large enough to contain relatively bulky items such as sweaters, purses and packages, and a compartment may be provided for storing an umbrella. The pouch section located on the inside of the arm rest may be used for transporting relatively small items such as medicine containers, glasses, a wallet, makeup, etc. This inner pouch section also may be divided into separate compartments.

An object of the invention is to provide a secure means for transporting small to medium size items by people who are restricted to wheelchairs.

Another object of the invention is to provide a portable means, easily attachable to a wheelchair arm rest, for transporting small items such as keys, makeup or medication for wheelchair-bound persons.

Another object of the invention is to provide a secure storage means, easily attachable to a wheelchair, that also provides a splash guard to protect the occupant of the wheelchair, as well as a person who might be pushing the wheelchair, when the wheelchair is used on wet surfaces.

These and further objects and advantages of the invention will be readily understood as the following description is read in conjunction with the accompanying drawings, in which like reference numerals have been used to designate like elements throughout the several views.

DESCRIPTION OF THE PREFERRED EMBODIMENTS

Figure 1:
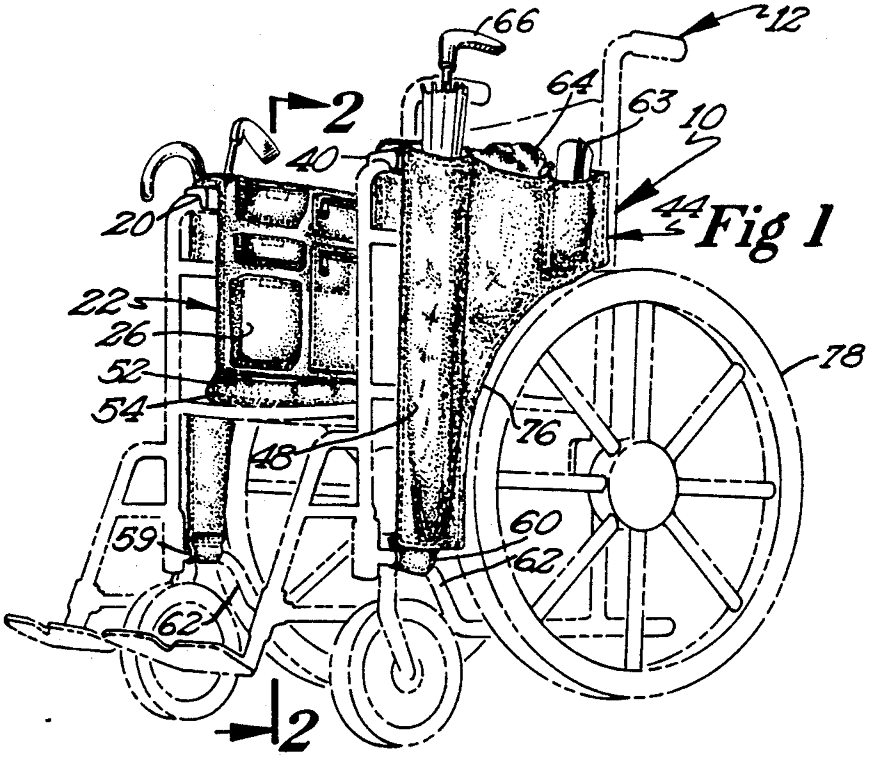
FIG. 1 is a perspective view of a wheelchair with an embodiment of the invention installed and in normal use.

With reference to the drawings, and in particular to FIG. 1, the wheelchair arm rest and pouch is generally indicated by reference numeral 10. The secure storage device 10 of the embodiment shown in FIGS. 1 and 2 is attached to a wheelchair generally indicated by reference numeral 12.

Figure 2:
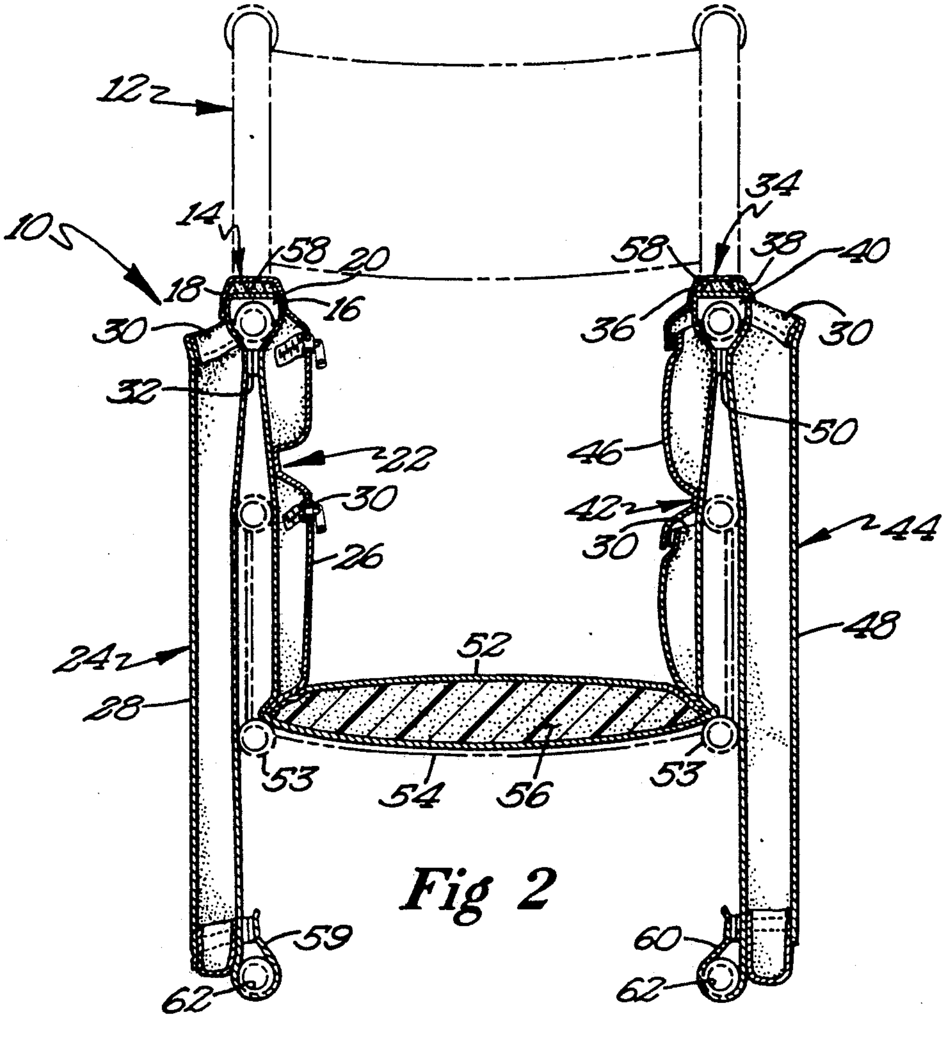
FIG. 2 is an end view of the wheelchair taken along line 2—2 of FIG. 1.

Secure storage device 10 as illustrated in FIGS. 1 and 2 includes a first transverse or spanning portion 14 having a first edge 16 and a second edge 18 opposing first edge 16. First transverse portion 14 is positioned above the first arm resting portion 20 of the wheelchair 12. First flap portion 22 is hingedly attached to and downwardly depending from first edge 16 of first transverse portion 14. Second flap portion 24 is hingedly attached to and downwardly depending from second edge 18 of first transverse portion 14. At least one storage compartment 26 is provided integral with first flap portion 22, and at least one storage compartment 28 is provided integral with second flap portion 24. Each storage compartment 26, 28 has an access opening 30, and each access opening 30 has an open position and a closed position. First releasable attachment means 32, such as VELCRO ®, snaps or buttons, is provided for releasably attaching first flap portion 22 to second flap portion 24. As may be most clearly seen in FIG. 2, releasable attachment means 32 is positioned below first arm resting portion 20 of wheelchair 12.

As shown in FIGS. 1 and 2, secure storage device 10 also includes second transverse portion 34 having a first edge 36 and a second edge 38 opposing first edge 36. Second transverse portion 34 is positioned above the second arm resting portion 40 of the wheelchair 12. Third flap portion 42 is hingedly attached to and downwardly depending from first edge 36 of second transverse portion 34. Fourth flap portion 44 is hingedly attached to and downwardly depending from second edge 38 of second transverse portion 34. At least one storage compartment 46 is provided integral with third flap portion 42, and at least one storage compartment 48 is provided integral with fourth flap portion 44. Each storage compartment 46, 48 has an access opening 30, and each access opening 30 has an open position and a closed position. Second releasable attachment means 50, such as VELCRO ®, snaps or buttons, is provided for releasably attaching third flap portion 42 to fourth flap portion 44. As may be most clearly seen in FIG. 2, second releasable attachment means 50 is positioned below second arm resting portion 40 of wheelchair 12.

Finally, the embodiment of secure storage device 10 illustrated in FIGS. 1 and 2 includes connecting means 52 extending across the wheelchair seat portion 54 for connecting first flap portion 22 with third flap portion 42, whereby when the wheelchair user rests on wheelchair seat portion 54, connecting means 52 is maintained in position by the weight of the wheelchair user, providing additional security for secure storage device 10. A fastening strap member, not shown, may also be provided to attach connecting means 52 to the tubular supports 53 of wheelchair 12 to which wheelchair seat portion 54 is attached. Connecting means 52 may also include a padded portion 56 therein, providing greater comfort for the wheelchair user. Likewise, transverse portions 14, 34 may also include a padded portion 58 therein, whereby the user of the wheelchair, upon resting their arm upon padded transverse portions 14, 34, will enhance the security of secure storage device 10 by making it more difficult to remove from arm resting portions 20, 40 of wheelchair 12.

As shown in FIGS. 1 and 2, first releasable restraining means 59 and second releasable restraining means 60, including straps and releasable fasteners such as VELCRO ®, snaps or buttons, may extend from second flap portion 24 and fourth flap portion 44, respectively. These releasable restraining means 58, 60 wrap around tubular supports 62, and prevent second flap portion 24 and fourth flap portion 44 from flapping about or otherwise becoming dislodged or tangled in the wheelchair wheels. Releasable restraining means 58, 60 may be found on this or other embodiments of the invention.

Figure 3:
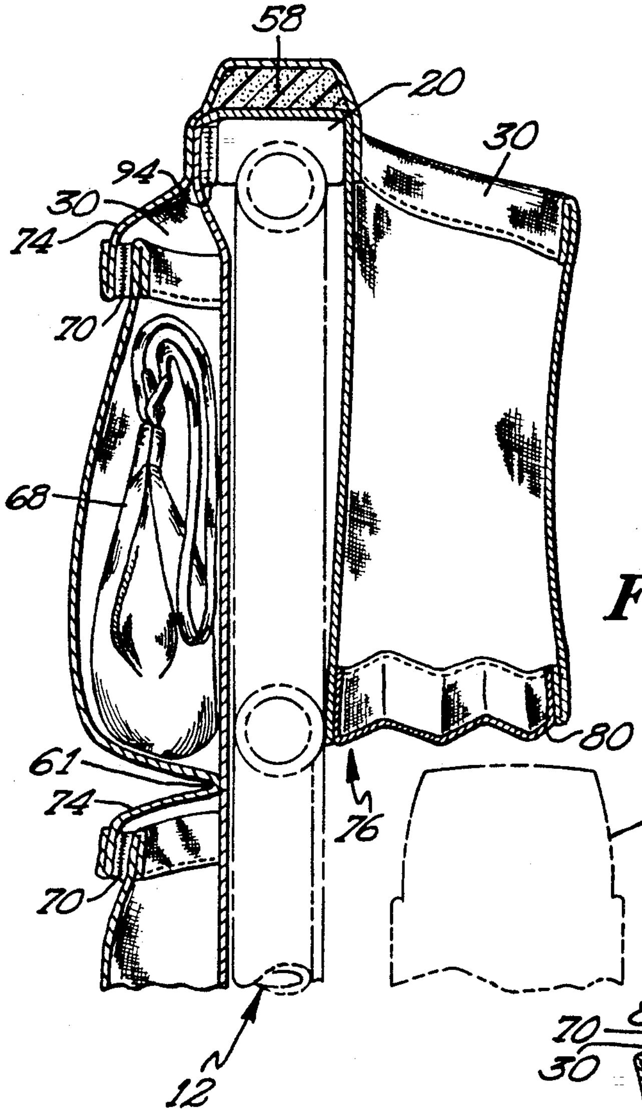
FIG. 3 is a cutaway view of another embodiment of the invention shown mounted to an arm of the wheelchair.

As illustrated in the several views; pouches may be provided in any or all of the flap portions in any of several configurations. Pouches of various sizes may be provided by placing dividers between or within pouches. Such a divider may be provided simply as by stitching 61, as shown in FIG. 3. Items that may be carried in the pouches include but are not limited to magazines 63, sweaters 64, umbrellas 66 or purses 68. Other items such as pencils, eyeglasses, cosmetics and medicine may be carried in any of the several pouches. The pouches may be left in an open position as shown in FIG. 3, but to provide greater security for the items stored therein, it is preferred that each pouch include a closure means such as VELCRO ® fastener 70. Other fasteners such as the zipper fastener shown in FIG. 2, or snaps or buttons may also be employed. As also shown in FIG. 3, the pouches may also include a protective flap 74.

As may best be seen in FIG. 1, outer flap portions 24, 44 may be contoured along their bottom edge portions 76 to conform to the shape of the large rear wheel 78 of wheelchair 12. Each bottom edge portion 76 may include a spanning segment 80, which is shown as an accordion pleated insert in FIG. 3. Spanning segment 80 spans the depth of rear wheel 78, providing additional storage space within the pouches. When spanning segment 80 is present, it is preferred that it comprise a waterproof material, whereby items stored in the storage pouches or compartments of the outer flap portions may be protected from moisture deposited on spanning segments 80 by rear wheel 78 of wheelchair 12.

Figure 4:
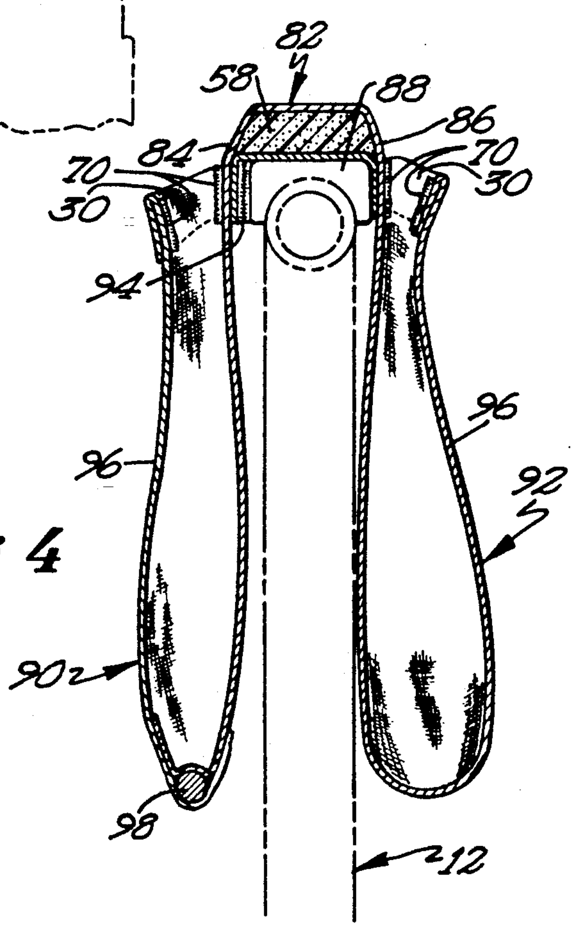
FIG. 4 is a cutaway view of yet another embodiment of the invention shown mounted to an arm of the wheelchair.

With reference to FIG. 4, an alternate embodiment of secure storage device 10 includes a transverse portion 82 having a first edge 84 and a second edge 86. Transverse portion 82 is positioned above arm resting portion 88 of wheelchair 12. First or inner flap portion 90 is hingedly attached to and downwardly depending from first edge 84 of transverse portion 82. Second or outer flap portion 92 is hingedly attached to and downwardly depending from second edge 86 of transverse portion 82. First releasable attachment means 94, such as VELCRO ®, snaps or buttons, is provided to allow storage device 10 to be releasably attached to arm resting portion 88 of wheelchair 12. At least one storage compartment 96 is provided integral with at least one of the flap portions 90, 92. Each storage compartment 96 includes an access opening 30, each access opening 30 having an open position and a closed position. This embodiment of the invention may be used on one or both of the arm resting portions 88 of wheelchair 12. Transverse portion 82 may also include a padded portion 58 therein, whereby the user of the wheelchair, upon resting his arm upon padded transverse portion 82, will enhance the security of secure storage device 10 by making it more difficult to remove from arm resting portions 88 of wheelchair 12.

In the preferred version of this embodiment, first releasable attachment means 94 is integral with first or inner flap portion 90. It is also preferred that a weight member 98 be contained within first flap portion 90, preferably sewn into a storage compartment 96 contained within first flap portion 90. The use of weight member 98 within inner flap portion 90 weighs down inner flap portion 90, helping inner flap portion 90 maintain a generally downward depending alignment from transverse portion 82, increasing the comfort of the wheelchair user.

As with the first embodiment discussed above, second flap portion 92 may also be contoured along its bottom edge portion 76 to conform to the shape of the large rear wheel 78 of wheelchair 12. It should be kept in mind, however, that each embodiment of the invention may be provided with either an inner flap portion 22, 42, 90, or an outer flap portion 24, 44, 92, or both. Therefore, it follows that releasable attachment means 32, 50 may also be provided with this embodiment should both flap portions 90, 92 be incorporated therein.

In operation, the wheelchair arm rest and pouch 10 would be positioned above an arm resting portion 88 of wheelchair 1 with padded transverse portion 82 positioned above and along arm resting portion 88. Releasable attachment means 94 should be positioned on the inside edge of arm resting portion 88. Items may then be placed in the pouches provided on the inner or outer flap portions 90, 92. If there is an inner flap portion 90 that does not extend down to connecting means 52, a weight member 98 would preferably be sewn into the lower edge of inner flap portion 90. Items may be placed in any of the pouches as needed by the user of wheelchair 12, and the pouches should be secured using closure means 70, although some items such as umbrella 66 may protrude from their pouches. It is preferred, however, that items such as purse 68 be placed into a large enough pouch to ensure that any handles or other protruding portions will be completely enclosed and secured within the pouch. As the user of wheelchair 12 moves about, the contents of the various pouches will not be apparent to passersby, thus diminishing the likelihood that anyone would attempt to steal or otherwise remove any valuable items from the possession of the wheelchair user. Further, since the padded transverse portion 82 makes the arm resting portion 88 more comfortable for the wheelchair user, the presence of the user's arm resting on the arm rest 10 makes it more difficult to remove from wheelchair 12. This is especially useful in the instant when the wheelchair user dozes while resting in the wheelchair. If the user's arms are resting on the arm rests 10, the arm rests 10 may not be removed without waking the wheelchair user.

To install wheelchair arm rest and pouch 10 including connecting means 52 one would similarly position the two transverse portions 14, 34 above arm resting portions 20, 40, respectively. Connecting means 52 may not be attached permanently to inner flap portions 22, 42, and connecting means 52 must then be fastened as by zipper, snaps, etc. Likewise, connecting means 52 may also be provided with straps, laces or other fasteners for attachment to tubular supports 53 of wheelchair 12. Finally, with either embodiment of the invention, releasable restraining means 59, 60 may be provided for fastening outer flap portions 24, 44 to tubular supports 62 of wheelchair 12. Once these are fastened, this embodiment of secure storage device 10 is fully installed and ready for use as above.

It is anticipated that various changes may be made in the size, shape, and construction of the wheelchair arm rest and pouch disclosed herein without departing from the spirit and scope of the invention as defined by the following claims.

What is claimed is:

1. A device for safely and securely storing and transporting personal items of a wheelchair user, usable with a wheelchair or similar wheeled vehicle having at least one arm resting portion and a frame, comprising:

a transverse portion having a first edge and a second edge opposing said first edge, said transverse portion positioned above the arm resting portion of the wheelchair;

a first flap portion hingedly attached to and downwardly depending from said first edge of said transverse portion;

a second flap portion hingedly attached to and downwardly depending from said second edge of said transverse portion;

a first releasable attachment means by which the storage device may be releasably attached to the arm resting portion of the wheelchair; and at least one storage compartment integral with at least one of said flap portions, each said storage compartment having an access opening, each said access opening having an open position and a closed position.

2. A safe and secure storage device as described in claim 1, wherein:

said transverse portion includes a padded portion therein, whereby the user of the wheelchair, upon resting their arm upon said padded transverse portion, will enhance the security of said device by making it more difficult to remove from the arm resting portion of the wheelchair.

3. A safe and secure storage device as described in claim 1, wherein:

said first releasable attachment means is integral with said first flap portion.

4. A safe and secure storage device as described in claim 1, further comprising:

a weight member contained within said first flap portion, whereby said weight member weighs down said first flap portion, helping said first flap portion maintain a generally downward depending alignment from said transverse portion, increasing the comfort of the wheelchair user.

5. A safe and secure storage device as described in claim 1, further comprising:

means for releasably securing said access opening of each said storage compartment in said closed position, whereby said access opening may be opened to its said open position by releasing said releasable securing means.

6. A safe and secure storage device as described in claim 5, wherein:

at least one said storage compartment includes at least one divider, each said divider defining a subcompartment contained therein.

7. A safe and secure storage device as described in claim 1, wherein:

said storage compartment is on said first flap portion; and said second flap portion includes at least one storage compartment.

8. A safe and secure storage device as described in claim 7, wherein:

said second flap portion includes a bottom edge portion contoured to conform to the shape of a wheelchair rear wheel.

9. A safe and secure storage device as described in claim 8, wherein:

said bottom edge portion of said second flap portion includes a spanning segment.

10. A safe and secure storage device as described in claim 9, wherein:

said spanning segment comprises a waterproof material, whereby items stored in each said storage compartment of said second flap portion may be protected from moisture deposited on said spanning segments by the rear wheel of the wheelchair.

11. A safe and secure storage device as described in claim 7, further comprising:

a second releasable attachment means for releasably attaching said second flap portion to the frame of the wheelchair.

12. A device for safety and securely storing and transporting personal items of a wheelchair user, usable with a wheelchair or similar wheeled vehicle having at least one elongated arm resting portion and a frame, comprising:

a transverse portion positionable on and extending substantially the entire length of the arm resting portion of the wheelchair;

a padded portion extending along a length of said transverse portion to encourage the user to lean his arm on said transverse portion to enhance the security of the device;

a flap portion hingedly attached to said transverse portion, said flap portion including means for releasably attaching the storage device to the wheelchair; and a storage compartment having an access opening, said storage compartment integral with said flap portion, said access opening having an open position and a closed position.

13. A safe and secure storage device as described in claim 12, further comprising:

means for releasably securing said access opening of said storage compartment in said closed position, whereby said access opening may be opened to its said open position by releasing said releasable securing means.

14. A safe and secure storage device as described in claim 12, wherein:

said integral storage compartment includes at least one divider, each said divider defining a subcompartment contained therein.

15. A safe and secure storage device as described in claim 12, further comprising:

a weight member contained within said flap portion, whereby said weight member weighs down said flap portion, helping said flap portion maintain a generally downward depending alignment from said transverse portion, increasing the comfort of the wheelchair user.

16. A device for safely and securely storing and transporting personal items of a wheelchair user, usable with a wheelchair or similar wheeled vehicle having a frame, a seat portion and first and second arm resting portions, comprising:

a first transverse portion having a first edge and a second edge opposing said first edge, said first transverse portion positioned above the first arm resting portion of the wheelchair;

a second transverse portion having a first edge and a second edge opposing said first edge, said second transverse portion positioned above the second arm resting portion of the wheelchair;

a first flap portion hingedly attached to and downwardly depending from said first edge of said first transverse portion;

a second flap portion hingedly attached to and downwardly depending from said second edge of said first transverse portion;

a third flap portion hingedly attached to and downwardly depending from said first edge of said second transverse portion;

a fourth flap portion hingedly attached to and downwardly depending from said second edge of said second transverse portion;

at least one storage compartment integral with said first flap portion, each said storage compartment having an access opening, each said access opening having an open position and a closed position;

at least one storage compartment integral with said second flap portion, each said storage compartment having an access opening, each said access opening having an open position and a closed position;

at least one storage compartment integral with said third flap portion, each said storage compartment having an access opening, each said access opening having an open position and a closed position;

at least one storage compartment integral with said fourth flap portion, each said storage compartment having an access opening, each said access opening having an open position and a closed position:

a first releasable attachment means for releasably attaching said first flap portion to said second flap portion, said first releasable attachment means positioned below the first wheelchair arm resting portion;

a second releasable attachment means for releasably attaching said third flap portion to said fourth flap portion, said second releasable attachment means positioned below the second wheelchair arm resting portion; and connecting means extending across the wheelchair seat portion for connecting said first flap portion with said third flap portion, whereby when the wheelchair user rests on the wheelchair seat portion, said connecting means is maintained in position by the weight of the wheelchair user, providing additional security for said device.

17. A safe and secure storage device as described in claim 16, wherein:

said first and second transverse portions include a padded portion therein, whereby the user of the wheelchair, upon resting their arm upon said padded transverse portions, will enhance the security of said device by making it more difficult to remove from the arm resting portion of the wheelchair.

18. A safe and secure storage device as described in claim 16, wherein:

said connecting means comprises a padded portion therein, providing greater comfort for the wheelchair user.

19. A safe and secure storage device as described in claim 16, further comprising:

a first releasable restraining means for releasably attaching said second flap portion to the frame of the wheelchair; and a second releasable restraining means for releasably attaching said fourth flap portion to the frame of the wheelchair.

20. A safe and secure storage device as described in claim 19, wherein:

said second flap portion includes a bottom edge portion contoured to conform to the shape of a wheelchair rear wheel; and said fourth flap portion includes a bottom edge portion contoured to conform to the shape of a wheelchair rear wheel.

21. A safe and secure storage device as described in claim 20, wherein:

said bottom edge portions of said second flap portion and said fourth flap portion include a spanning segment.

22. A safe and secure storage device as described in claim 21, wherein said spanning segments comprise a waterproof material, whereby items stored in said storage compartments of said second and fourth flap portions may be protected from moisture deposited on said spanning segments by the rear wheel of the wheelchair.

23. A device for securely storing and transporting personal items of a wheelchair user, usable with a wheelchair or similar wheel vehicle having a frame and at least one elongated arm resting portion on which the user can rest his arm, comprising:

a spanning portion receivable on and extending substantially the entire length of the arm resting portion of the wheelchair so as to allow the user to conveniently cover said spanning portion with the user's arm;

a padded portion extending along a length of said spanning portion to encourage the user to lean his arm on said spanning portion to enhance the security of the device;

a first flap portion carried by and downwardly depending from said spanning portion;

a first releasable attachment means by which the storage device may be releasably attached to the arm resting portion of the wheelchair; and at least one storage compartment carried by said first flap portion, said storage compartment having an access opening.

24. A storage device as described in claim 23, said spanning portion further comprising:

first and second edges generally parallel to the arm resting portion, said first flap portion depending from said first edge; and a second flap portion carried by and downwardly depending from said second edge of said spanning portion.

25. A storage device as described in claim 24, wherein said first releasable attachment means comprises:

a first attachment portion on said first flap portion; and a second attachment portion on said second flap portion, whereby said first attachment portion and said second attachment portion cooperate with one another to permit the releasable attachment of the storage device to the wheelchair.

26. A storage device as described in claim 25, wherein: said attachment means is a VELCRO type closure.

27. A storage device as described in claim 23, said spanning portion further comprising:

first and second edges generally parallel to the arm resting portion, said first flap portion depending from said first edge; and a second flap portion carried by and downwardly depending from said second edge of said spanning portion.

28. A storage device as described in claim 27, further comprising:

at least one storage compartment carried by said second flap portion, said storage compartment carried by said second flap portion having an access opening.

29. A storage device as described in claim 28, wherein said first releasable attachment means further comprises:

a first attachment portioned fastened to said first flap portion; and a second attachment portion fastened to said second flap portion, whereby said first attachment portion and said second attachment portion cooperate with one another to permit the releasable attachment of the storage device to the wheelchair.

30. A storage device as described in claim 23, further comprising:

means for releasably securing said access opening of said storage compartment, whereby said access opening may be changed from a closed condition to an open condition by releasing said releasable securing means.

31. A storage device as described in claim 23, wherein:

said first attachment means is on said first flap.

* * * * *